United States Patent

Paz-Pujalt et al.

[11] Patent Number: 5,123,752
[45] Date of Patent: Jun. 23, 1992

[54] WEAR RESISTANT TEMPERATURE SENSING DEVICE

[75] Inventors: Gustavo R. Paz-Pujalt; Dilip K. Chatterjee, both of Rochester, N.Y.

[73] Assignee: Eastman Kodak Company, Rochester, N.Y.

[21] Appl. No.: 685,311

[22] Filed: Apr. 15, 1991

[51] Int. Cl.⁵ .............................................. G01K 13/04
[52] U.S. Cl. .................................... 374/153; 338/23
[58] Field of Search ......................... 374/153; 338/23; 219/216

[56] References Cited

U.S. PATENT DOCUMENTS

| | | | |
|---|---|---|---|
| 3,019,404 | 1/1962 | Fastenau et al. | 338/28 |
| 3,183,718 | 5/1965 | Schnedler | 73/351 |
| 3,472,074 | 10/1969 | Glang et al. | 73/362 |
| 3,888,622 | 6/1975 | Thettu | 432/36 |
| 4,050,052 | 9/1977 | Reichelt et al. | 338/308 |
| 4,050,803 | 9/1977 | McCarroll | 355/3 R |
| 4,103,275 | 7/1978 | Diehl et al. | 338/25 |
| 4,186,368 | 1/1980 | White et al. | 338/28 |
| 4,242,659 | 12/1980 | Baxter et al. | 338/28 |
| 4,301,359 | 11/1981 | Ito et al. | 219/469 |
| 4,373,802 | 2/1983 | Yuge et al. | 355/14 FU |
| 4,419,652 | 12/1983 | Balmforth et al. | 338/28 |
| 4,424,507 | 1/1984 | Nagai et al. | 338/22 R |
| 4,515,484 | 5/1985 | Gilley | 374/153 X |
| 4,580,033 | 4/1986 | Sakurai | 219/216 |
| 4,633,069 | 12/1986 | Berg et al. | 338/23 X |
| 4,719,489 | 1/1988 | Ohkubo et al. | 355/3 FU |
| 4,780,742 | 10/1988 | Takahashi et al. | 355/3 FU |
| 4,791,448 | 12/1988 | Kawashima et al. | 355/3 FU |
| 4,821,062 | 4/1989 | Katoh et al. | 355/3 |
| 4,841,273 | 6/1989 | Horton | 338/28 |
| 4,859,081 | 8/1989 | Kabayashi | 374/179 |
| 4,905,050 | 2/1990 | Derimiggio et al. | 355/290 |
| 4,905,051 | 2/1990 | Satoh et al. | 355/290 |
| 4,920,250 | 4/1990 | Urban | 219/216 |
| 4,951,096 | 8/1990 | Derimiggio et al. | 355/285 |

FOREIGN PATENT DOCUMENTS

| | | | |
|---|---|---|---|
| 3009108 | 9/1981 | Fed. Rep. of Germany | 374/153 |
| 44633 | 3/1984 | Japan | 374/153 |
| 1181872 | 2/1970 | United Kingdom | 374/153 |

Primary Examiner—Daniel M. Yasich
Attorney, Agent, or Firm—David A. Howley

[57] ABSTRACT

A temperature sensing device for moving surfaces such as electrostatographic fusing rollers includes an electrothermal material such as a thermistor printed on a concave shaped, thermally conductive ceramic substrate with a high temperature lubricant between the ceramic substrate and the moving surface.

13 Claims, 3 Drawing Sheets

WEAR RESISTANT TEMPERATURE SENSING DEVICE

BACKGROUND OF THE INVENTION

1. Technical Field

This invention relates generally to temperature control of moving members, such as the fusing rollers of electrostatographic document production apparatus, and more particularly to wear resistant temperature sensing devices for such control systems.

2. Background Art

The use of temperature sensing devices for controlling the temperature of heated fusing rollers in electrostatographic document production apparatus is well known. The devices generally include a sensor element, such as a thermistor, which must be in good thermal contact with the fusing roller, thermally insulated from other portions of the apparatus, and protected from abrasion by the moving roller.

Conventional temperature sensor elements include thermistors which are disposed in contact with the roller's surface as in U.S. Pat. No. 4,905,051, are embedded in silicone rubber with a teflon coating as in U.S. Pat. No. 4,821,062, and are carried by graphite shoes which contact the roller.

DISCLOSURE OF INVENTION

It is an object of the present invention to provide a temperature sensing device for moving fusing rollers which provide excellent wear protection for the sensor element, economical manufacture, and accurate response.

According to the present invention, a wear resistant device for detecting the temperature of a moving surface includes a thermally conductive ceramic substrate adapted to make heat conducting contact the moving surface, and a temperature sensor element carried by the substrate, whereby the substrate conducts heat from the moving surface to the sensor element. The sensor element is adapted to produce a signal characteristic of the temperature of the element.

According to a preferred embodiment of the present invention, the temperature sensor element is formed of an electrothermal material such as a thermistor. The electrothermal material may have a positive or a negative temperature coefficient. The temperature sensor element is formed on said ceramic substrate by a patterning technology printing process, and is sandwiched between the ceramic substrate and a thermally insulating backing layer.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present invention will be described with particular reference to an electrostatographic apparatus. The invention, however, is equally useful in other environments where the surface temperature of a moving member is required, and abrasion of the sensor element is of concern.

Figure 1:
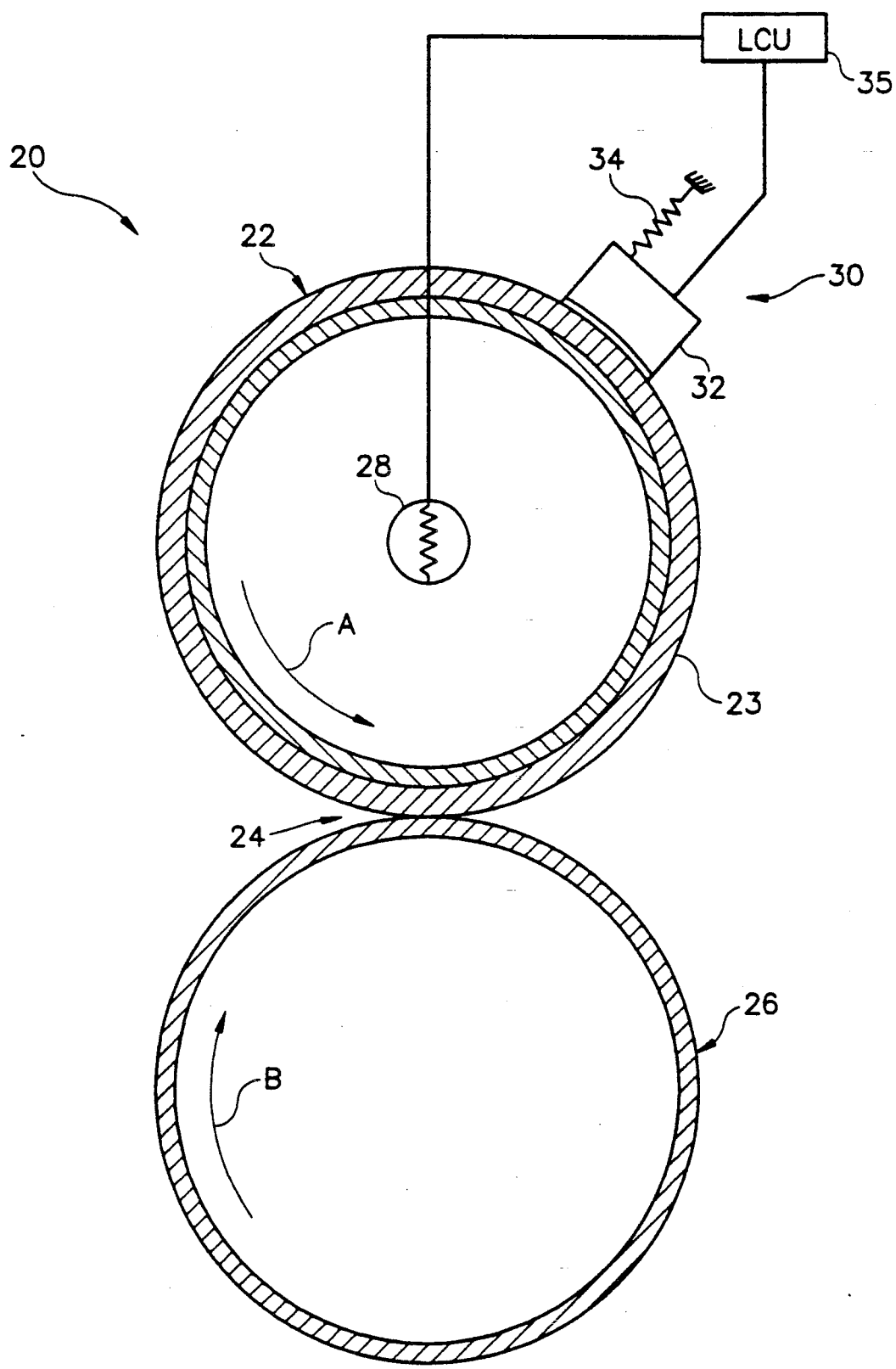
FIG. 1 is a schematic of an electrostatographic fusing apparatus including the temperature sensing device according to the present invention.

Referring now to FIG. 1, an apparatus, suitable for fusing toner images in an electrostatographic copier or printer is generally designated 20, and includes a heated roller 22 that forms a fusing nip 24 with a pressure roller 26. Fuser roller 22 has a surface 23 adapted for producing a good finish on fused copies. Fuser roller 22 and pressure roller 26 are drivable by suitable means (not shown) for movement in the directions of arrows A and B, respectively. One of the rollers, for example fuser roller 22, is heated by a heat exchange source 28 such as illustrated quartz lamp.

In order to operate apparatus 20, heat exchange source 28 is first turned on and allowed to supply heat to, and to warm up fuser roller 22 through a warmup period until the temperature of surface 23 reaches a desired set point. Thereafter, the apparatus can be used to fuse toner images that are conveyed on a substrate or copy sheet of paper (not shown) through fusing nip 24. For excellent fusing results, the actual temperature, during fusing, of surface 23 must thereafter be accurately controlled and maintained at such a desired temperature set point. Such accurate control is necessary because an actual temperature of surface 23 that is significantly below the desired set point will result in incomplete fusing, and one that is significantly above the desired set point may result in curling and possible charring of the substrate or copy sheet.

For such needed accurate temperature control, apparatus 20 therefore includes the temperature control system of the present invention generally designated 30. System 30 includes a temperature sensing device 32 positioned in heat sensing contact with surface 23 of heated fuser roller 22, and is also connected to means, such as a spring 34, which resiliently urges the sensing device toward surface 23.

Although sensing device 32 is described here with particular reference to its use on a heated fuser roller of an electrostatographic fusing apparatus, it is equally useful in relation to other members or environments being heated or being cooled. The same is true of the overall temperature control system 30 of the present invention. The description here with particular reference to a heated fusing apparatus is not a limitation, but merely an example of a particular use.

In addition to sensing device 32, temperature control system 30 further includes a logic and control unit 35 which is connected to the heat exchange source 28, and to temperature sensing device 32. Generally, in this arrangement, the environment or member, such as heated surface 23 of fuser roller 22, transfers heat from the heat exchange source 28 to sensing device 32, and sensing device 32 then responsively produces an output signal corresponding to the temperature being sensed. Logic and control unit 35, as is well known, can then utilize the output signal of sensing device 32 to control the temperature of surface 23 of fuser roller 22. Such control, as is also well known, may be achieved by controlling the on/off cycling of heat exchange source 28.

The precision or accuracy of such temperature control about a desired set point, of course, depends primarily on the precision of sensing device 32, or more specifically, on the precision of the particular temperature sensor element that is used in sensing device 32 for controlling the heat exchange source 28. Conventionally, it is well known to use expensive high- precision, small tolerance temperature sensor elements, such as plus or minus 1% thermistors, in order to achieve precise temperature control. This is particularly true in the case of electrostatographic document production apparatus in which accurate control is needed for obtaining satisfactory results from the fusing apparatus.

Figure 2:
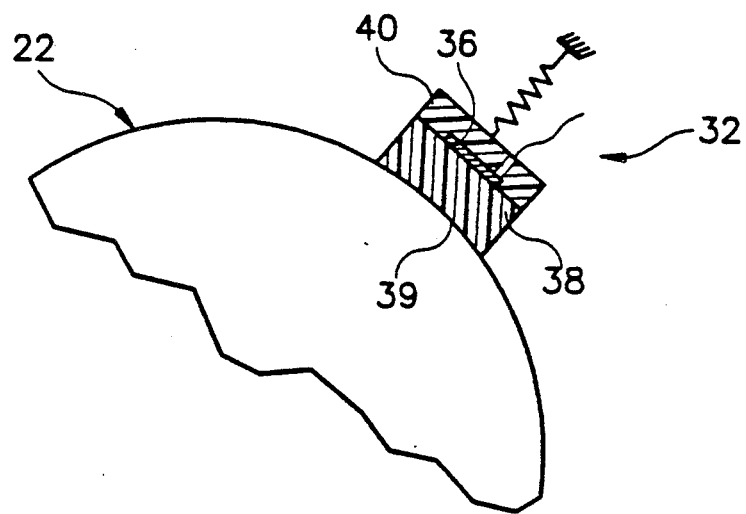
FIG. 2 is an enlarged side section of the temperature sensing device of FIG. 1.
Figure 4:
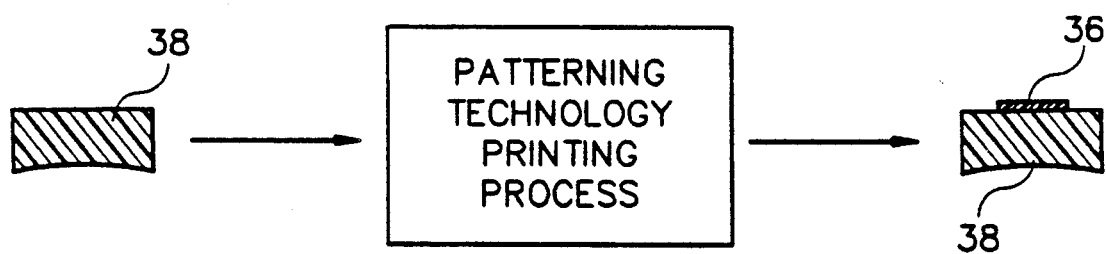
FIG. 4 illustrates a patterning technology printing process for depositing electrothermal material in accordance with one feature of the present invention.

Referring to FIG. 2, a preferred embodiment of the temperature sensing device of the present invention includes a temperature sensor element 36 on a substrate 38. Sensor element 36 is preferably an electrothermal material such as a thermistor, which must be in good thermal contact with the fusing roller, thermally insulated from other portions of the apparatus, and protected from abrasive contact with the moving roller. Sensor element 36 may be a positive temperature coefficient material such as ruthenium oxide ($RuO_2$), or a negative temperature coefficient material such as nickel oxide (NiO). As shown in FIG. 4, the material may be deposited onto the substrate 38 by a screen printing process, permitting the use of patterning technology such as screen printing stenciling, photolithography, sputtering, doctor blading, etc.; whereby the shape of the sensor will conform to a specified area. These techniques permit the construction of low thermal mass, and permit the deposit of additional layers such as conductive layers of silver (Ag), palladium (Pd), silver-palladium alloy (Ag-Pd), gold (Au), platinum (Pt), etc. for electrodes, dielectric protective layers 39, and lubricating layers of, say, molybdenum disulfide ($MoS_2$), graphite, etc.

The sensor element is thermally insulated from the apparatus by a backing 40 formed of insulative material such as polymeric (Teflon), polyvinyl chloride (PVC), phenolic, Darlan, etc. The backing may be formed by cutting the desired shape from a solid or by molding. Preferably, the thermal conductivity should be less than 0.5 Watt per meter degree Kelvin, and the upper working temperature should be compatible with the operating temperature range of the sensor.

Substrate 38 is formed of a material which is highly abrasion and corrosion resistant, has a low coefficient of thermal expansion, and has a high thermal conductivity. In accordance with the present invention, it has been found that such characteristics can be found in thermally conductive ceramic materials such as refractory oxides, carbides and nitrides. For example, alumina, zirconia, aluminum nitride, and silicon carbide exhibit excellent characteristics, including thermal expansion coefficients of less than $10 \times 10^{-6}$ Kelvin$^{-1}$ and thermal conductivity of greater than 10 Watts per meter degree Kelvin.

The front wall of substrate 38 is shaped so as to achieve maximum contact with the member whose temperature is being sensed. For example, when temperature control system 30 is used for controlling the temperature of a heated fuser roller as shown in FIG. 1, the front wall of substrate 38 should be made concave, and have a radius of curvature substantially equal to the radius of the surface 23 of fuser roller 22.

Substrate 38 may be formed as a solid ceramic body or a flexible pre-ceramic tape (known as "Green Ceramic Tape") such as that manufactured by DuPont's Electronics Materials Division. When a flexible tape is used, it permits shaping of the substrate to a desired irregular or non-flat geometry. This is followed by thermal treatment which consists of baking at about 100° C. to 250° C., firing to remove organic binders at about 400° C., and sintering to obtain the hardened dense ceramic.

A high temperature thin film lubricant is preferably used between the ceramic substrate and the fusing roller. The lubricant may be silicon carbide (SiC), molybdenum disulfide ($MoS_2$), or other high temperature lubricant depending on the application. Antistatic coatings may be applied to inhibit the build up of electrostatic charges which tend to accumulate paper dust or other particulates. Suitable antistatics include vanadium oxide ($V_2O_5$), tin oxide ($SnO_2$), or mixtures of those two with appropriate dopants such as boron oxide, indium oxide, etc. Lattice vacancies may be introduced by slightly reducing the oxide with carbon monoxide, hydrogen, or oxygen deficient atmosphere.

Figure 3:
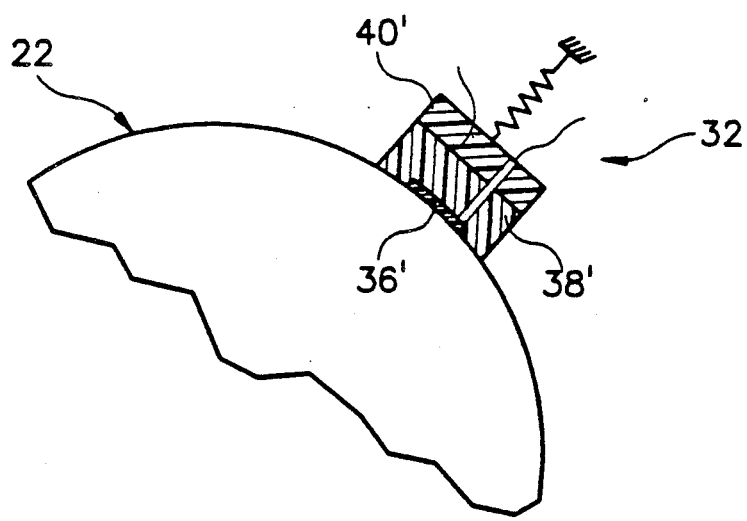
FIG. 3 is a view, similar to FIG. 2, of a second embodiment of the present invention.
Figure 5:
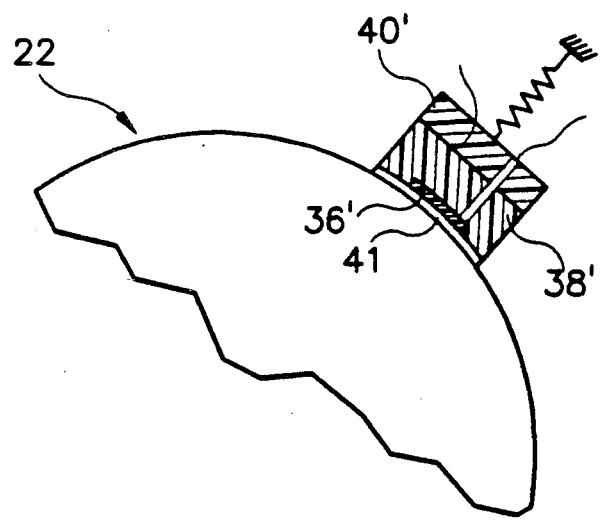
FIG. 5 is a view of a third embodiment of the present invention.

FIG. 3 is a second embodiment of the present invention. A temperature sensor element 36' is located on the concave surface of a substrate 38'. By recessing the sensor element into the substrate surface, good wear protection is attained. In FIG. 5, a thin film 41 of, say, silicon carbide has been provided to add protection to the sensor element.

The invention has been described in detail with particular reference to preferred embodiments thereof, but it will be understood that variations and modifications can be effected within the spirit and scope of the invention.

What is claimed is:

1. A wear resistant device for detecting the temperature of a moving surface; said device comprising:
   a thermally conductive ceramic substrate for selectively making heat conducting contact with the moving surface; and
   a temperature sensor means for producing a signal characteristic of the temperature of said surface, said sensor means being carried by said substate whereby said substrate conducts heat from the moving surface to said sensor means.

2. The device of claim 1 wherein said temperature sensor means comprises an element is formed of an electrothermal material.

3. The device of claim 2 wherein said electrothermal material comprises a thermistor temperature sensor element.

4. The device of claim 2 wherein said electrothermal material is a positive temperature coefficient material.

5. The device of claim 4 wherein said positive temperature coefficient material is ruthenium oxide.

6. The device of claim 2 wherein said electrothermal material is a negative temperature coefficient material.

7. The device of claim 6 wherein said negative temperature coefficient material is nickel oxide.

8. The device of claim 1 wherein said temperature sensor means is a printed element on said ceramic substrate.

9. The device of claim 1 further comprising a thermally insulating backing layer comprised of insulative material, said temperature sensor element being between said ceramic substrate and said backing layer.

10. The device of claim 1 wherein said ceramic substrate is comprised of a material selected from a group consisting of refractory oxides, carbides, and nitrides.

11. The device of claim 1 wherein said ceramic substrate is comprised of a ceramic material having a thermal conductivity greater than 10 Watts per meter degree Kelvin.

12. The device of claim 1 wherein said ceramic substrate is comprised of a flexible pre-ceramic tape subjected to a thermal treatment.

13. The device of claim 1 further comprising a high temperature thin film lubricant between said ceramic substrate and the moving surface.

* * * * *